United States Patent [19]

Burrowes

[11] Patent Number: 5,117,513
[45] Date of Patent: Jun. 2, 1992

[54] WATER SAVING, TOILET FLUSHING APPARATUS

[76] Inventor: Arthur G. Burrowes, 11091 N.W. 21st Ct., Sunrise, Fla. 33322

[21] Appl. No.: 612,484

[22] Filed: Nov. 14, 1990

[51] Int. Cl.⁵ .............................................. E03D 1/14
[52] U.S. Cl. ......................................... 4/324; 4/405; 4/415
[58] Field of Search ........................... 4/405, 410–412, 4/415, 324, 325, 661

[56] References Cited

U.S. PATENT DOCUMENTS

| | | | |
|---|---|---|---|
| 1,992,381 | 7/1934 | Lyons | 4/67 |
| 3,358,294 | 12/1967 | Nolan et al. | 4/405 X |
| 3,719,957 | 3/1973 | Riedel | 4/67 |
| 3,745,591 | 7/1973 | Girten | 4/324 X |
| 4,624,018 | 11/1986 | Kurtz | 4/325 |
| 4,864,665 | 9/1989 | Toltzman | 4/325 |
| 4,881,279 | 11/1989 | Harney | 4/324 |

Primary Examiner—Charles E. Phillips
Attorney, Agent, or Firm—R. M. Saccocio

[57] ABSTRACT

The present invention provides a standard toilet having a toilet tank associated therewith to be operable within a plurality of flush modes whereby more or less water may be flushed down a toilet. A simple two stage of flush mode of operation may be achieved by the present invention in order to flush either a liquid waste or a solid waste down a toilet. A cam adjusting member having a cam surface attached thereto is slid into or out of position relative to a standard cam member of a toilet flushing apparatus in order to limit or permit full rotation of the flush handle.

3 Claims, 2 Drawing Sheets

WATER SAVING, TOILET FLUSHING APPARATUS

BACKGROUND OF THE INVENTION

1. Field of the Invention

The present invention pertains in general to flushing apparatus for toilets and more particularly to toilet flushing apparatus having multiple flushing modes which provide for a normal and less than normal amount of water to be flushed down a toilet.

2. Description of the Prior Art

It is well known that water is becoming more and more scarce. Water conservation is, in effect, in many geographical locations. Further, mandatory water restrictions are in effect in certain of the geographical areas in order to limit the amount of use of fresh water. Of course, certain areas are affected more than others, but, in general, there is a definite trend toward requiring less and less water to be used for watering lawns, cleaning cars, personal hygiene, and even toilet use.

The amount of water flushed down toilets is inappropriately very high. With each flush, gallons of water go down the toilet and into a sewer or septic tank system. Furthermore, the amount of water flushed down a toilet is the same for liquid as well as solid wastes. Yet, because of the distinction between the type of wastes flushed down a toilet, less water is required for liquid wastes than for solid wastes. Again, in general, the flushing mechanism on a majority of the toilets in use today do not distinguish between liquid or solid waste products and, therefore, flush an inappropriately large amount of water down the toilet.

Various dual flush mechanisms are provided in the prior art. These prior art dual flush mechanisms provide for flushing differing amounts of water down a toilet depending upon the amount of water desired to be utilized with each flush. These prior art devices, in general, are fairly complex and cannot easily be retrofitted to existing toilet mechanisms. Or, these prior art devices are expensive and, therefore, are not readily acceptable to the general public.

Accordingly, a primary object of the present invention is to provide toilet flushing apparatus having dual modes of operation, each of which involves the flushing of a differing amount of water from a toilet tank down into and through the toilet bowl.

Another object of the present invention is to provide toilet flushing control apparatus which is very simple in operation and easily is converted from one mode of operation to the other mode of operation.

Another object of the present invention is to provide dual mode flushing apparatus for a toilet which may be used with a variety of the flushing valve mechanisms now in existence.

Another object of the present invention is to provide toilet flushing apparatus having multiple modes of operation which may be easily and inexpensively be retrofitted to a large majority of the toilets now in existence and in use.

The above-stated objects as well as other objects which, although not specifically stated, but are intended to be included within the scope of the present invention, are accomplished by the present invention and will become apparent from the hereinafter set forth Detailed Description of the Invention, Drawings, and the Claims appended herewith.

SUMMARY OF THE INVENTION

The present invention accomplishes the above-stated objectives as well as others, as may be determined by a fair reading and interpretation of the entire specification herein, and comprises multiple flush apparatus for discharging a variable amount of water through a flushing cycle of a tank equipped toilet.

Toilet flushing apparatus is provided whereby the amount of lift given to a flush valve located at the bottom of a tank of a toilet is made variable so that the time involved between lifting the valve mechanism and reseating of the valve mechanism is variable and thereby discharges differing amounts of water through the flushing valve of the toilet. Prior art flushing valves may be used with the present invention. As in the prior art, a flexible linking member or chain is connected between the end of a flushing valve which may either lift off the valve seat or be pivotal with respect thereto and the end of a lever rod which is fixedly connected to a flushing handle. A flushing handle includes a cam arrangement which is fixedly connected to a vertical wall of the flush tank and through which the lever rod passes and is connected to the flushing handle. The motion of the flushing handle is limited by a cam surface on the cam arrangement and thereby moves the lever rod a predetermined amount. The motion of the lever rod by a predetermined amount fixes the lift motion and time of the flushing valve within the tank. Retractable cam adjusting means is slidable with respect to the cam surface of the cam arrangement. When in position, the adjustable cam means further limits the distance through which the flushing handle may be rotated and thereby further limits the distance the lever rod connected thereto may also be rotated. With the adjusting cam means in position, a lesser amount of water is flushed down the toilet. With the adjusting cam means retracted, the full travel permitted by the cam means may be applied to the flushing handle and thereby flush the normal amount of water down the toilet. Thus, by operation of the cam adjusting means, the amount of water flushed down the toilet may be varied. In this manner, a lesser amount of water may be flushed, for example, when the waste comprises only liquid waste as compared to the amount of water that may be flushed down the toilet when the waste comprises solid waste.

BRIEF DESCRIPTION OF THE DRAWINGS

Various other objects, advantages, and features of the invention will become apparent to those skilled in the art from the following discussion taken in conjunction with the following drawings, in which.

DESCRIPTION OF THE PREFERRED EMBODIMENTS

Figure 1:
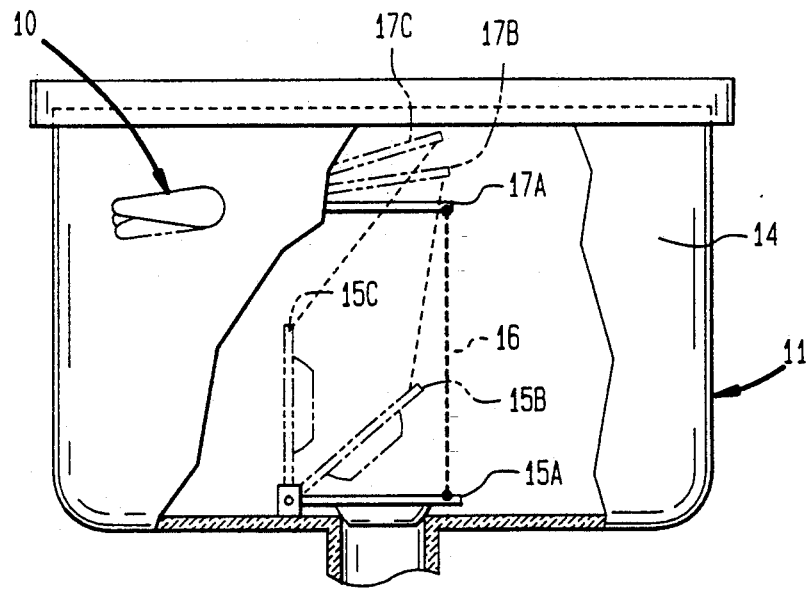
FIG. 1 is an elevational plan view of a typical tank for a toilet to which the present invention may be applied.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various figures are designated by the same reference numerals.

Referring now to FIG. 1 of the drawings, there is shown therein a typical water tank 11 of a toilet to which the inventive apparatus comprising a dual flush handle mechanism 10 is attached. A typical cover 12 is positioned on the top of toilet tank 11. Similarly, a typical exit port 13 is provided at the bottom of toilet tank 11 through which the water 14 in tank 11 may be flushed past a flushing valve arrangement 15 and down and through a toilet (not shown).

In the partially cut away portion of FIG. 1, the valve arrangement is shown in solid lines 15a in a closed position. The valve position shown in 15b is that of an intermediate position which occurs when the retractable cam adjusting means 10, as described hereinafter, is in place. The valve position shown as 15c is that of a full flush position as is commonly known in the prior art. It is to be noted that although the present invention is shown with a pivotal type of valve flushing mechanism 15, it is to be understood that any of the prior art valve flushing arrangements whereby one member is lifted from a valve seat is to be encompassed within the purview of the present invention.

A flexible connecting member 16, such as a chain or the like, is attached to the valve flushing arrangement 15 at one end and to a lever rod 17 connected to the inventive flushing handle arrangement 10. The lever positions 17a through 17c shown in FIG. 1 of the drawings correspond to the respective valve positions 15a through 15c. Accordingly, the inventive handle arrangement 10 provides for each of the valve 15 and lever 17 flushing and seated positions shown in FIG. 1 of the drawings.

Figure 2:
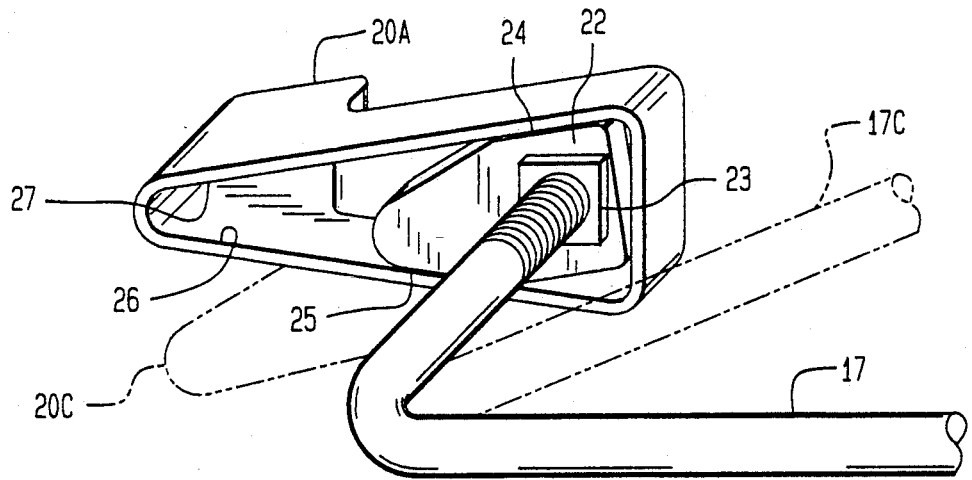
FIG. 2 is an isometric, rear view of a typical prior art flushing handle illustrating a cam mechanism and a lever arm attached thereto.

FIG. 2 illustrates a typical prior art flushing handle arrangement for a toilet. The view of the prior art toilet handle arrangement is shown from the back thereof in order to illustrate the typical workings of a cam arrangement therewithin. A cam mechanism 21 fits within the hollowed interior of handle 20 and is further positioned such that a square protruding member 23 thereof fits within a similarly shaped opening provided within the wall of toilet tank 11. The fit up between the square shaped member 23 and the toilet tank wall is such that rotation of the cam arrangement 21 is prohibited. Thus, cam arrangement 21 is fixed in position relative to toilet tank 11. On the other hand handle 20 and lever rod 17, fixedly connected thereto are rotatable with regard to the toilet tank 11. Most, if not all, prior art flushing handles operate in conjunction with a cam member in order to flush a toilet. Thus, the arrangement shown in FIG. 2 is intended to explain and describe, in general, prior art flush handles and cam arrangements.

The cam arrangement 21 includes a cam portion 22 having tapered cam surfaces 24 and 25. In the rest position, the weight of the lever rod 17 causes the handle assembly to attain the position shown as 20a in FIG. 2 of the drawings with a lower inside surface 26 of handle 20 up against the tapered cam surface 25 of cam mechanism 22. The rest position of the handle assembly shown in FIG. 2 is consistent with the "a" position of valve 15 and lever rod 17 of FIG. 1.

Still referring to the prior art arrangement shown in FIG. 2 of the drawings, when it is desired to flush the toilet associated with the handle arrangement of FIG. 2, handle 20 is pushed downward to the position shown as 20c. This results in lever rod 17 attaining the position shown as 17c and the upper inside surface 27 of handle 20 resting against tapered cam surface 24 of cam arrangement 22. This position corresponds to the fully flushed position shown in FIG. 1 of the drawings.

Figure 3:
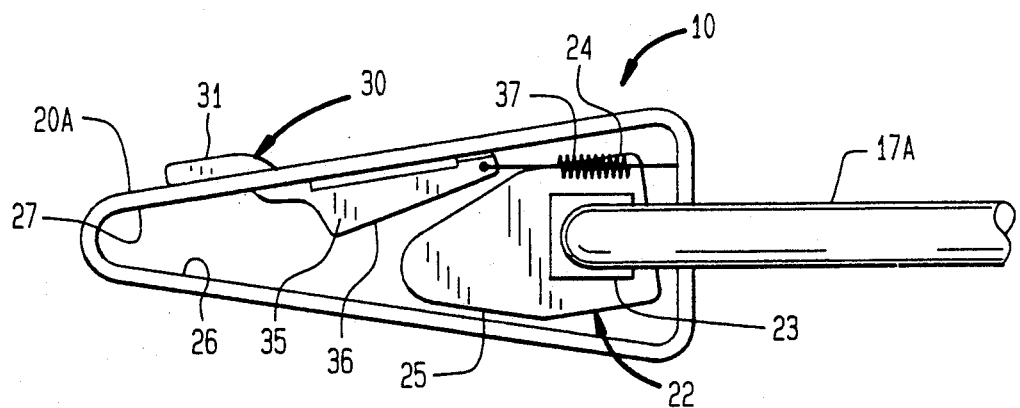
FIG. 3 comprises a plan back view of a typical toilet handle including a cam means to which the cam adjusting mechanism of the present invention is applied.

FIGS. 3 through 6 illustrate the inventive flush handle arrangement of the present invention in stages of operation attainable therewith. Referring now to FIG. 3 which is a plan back view of the handle arrangement 10, it is seen that a handle 20 having a lever rod 17 fixedly attached thereto and a cam arrangement 22 as is known in the prior art, may be used with the present invention. The position of handle 20 and lever rod 17 with respect to cam arrangement 22 is equivalent to that shown as position "a" in FIG. 1 of the drawings which is an "at rest" position of the handle arrangement 10. That is, in a position when the toilet tank 11 is filled with water 14 and before the toilet is flushed.

A cam adjusting mechanism 30 is positioned partially within and partially out of handle 20. An outside portion 31 which extends through an opening 32 in a top surface 33 of handle 20, is provided in order to allow a force by a person's finger, such as his thumb, to be applied thereto and to slide cam adjusting apparatus 30 with regard to handle 20 and cam arrangement 22. A lower portion 35 of cam adjusting apparatus 30 extends within the interior of handle 20. Cam adjusting apparatus 30 further includes a tapered cam surface 36 and the interior portion 35 thereof.

Figure 5:
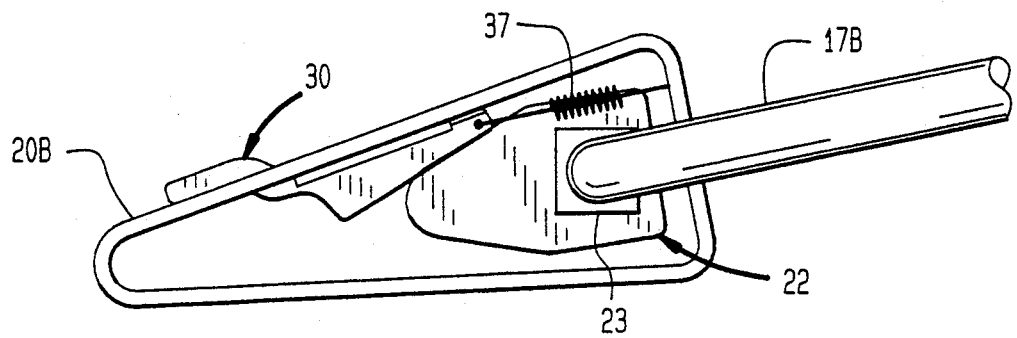
FIG. 5 is a rear plan view of the handle mechanism of FIG. 3 illustrating the rotation of the handle such with the cam adjusting means in place such that a lesser amount of water is flushed down the toilet.

When the cam adjusting arrangement 30 is in position as shown in FIG. 3, the amount of rotation of handle 20 relative to cam arrangement 22 is limited by portion 35 of the cam adjusting apparatus 30. In this mode of operation, handle 20 may be rotated to that position shown in FIG. 5 of the drawings. In FIG. 5 it is seen that the top surface 24 of the cam arrangement 22 is in contact with the tapered cam surface 36 of the cam adjusting arrangement 30. Thus, handle 20 will be rotated to that position shown in FIG. 5 of the drawings. Since lever rod 17 is attached to handle 20, lever rod 17 is also rotated to the "b" position shown in FIG. 5. Further rotation of handle 20 and lever rod 17 is prohibited by the physical presence of the cam adjusting member 30 in its forward position relative to handle 20. In comparing FIGS. 3 and 5, it is seen that the amount of rotation imparted to handle 20 is consistent with the existing space between cam surface 36 and cam surface 24.

The position of lever rod 17 shown in FIG. 5 is, therefore, consistent with the "b" position of the same shown in FIG. 1 of the drawings. This position also corresponds to an intermediate flush position whereby a less than full amount of water within tank 11 is desired to be flushed down the toilet. However, it is to be noted that a person operating the toilet, with the cam adjusting apparatus in the position shown in FIG. 3, can further determine and adjust the amount of water being flushed down the toilet by the amount of time the person holds his hand on the flush handle 20. The longer he holds his hand on the flush valve 20, valve 15 remains unseated and, hence, more water flows past valve 15 than if the flush handle 20 was immediately released.

Figure 6:
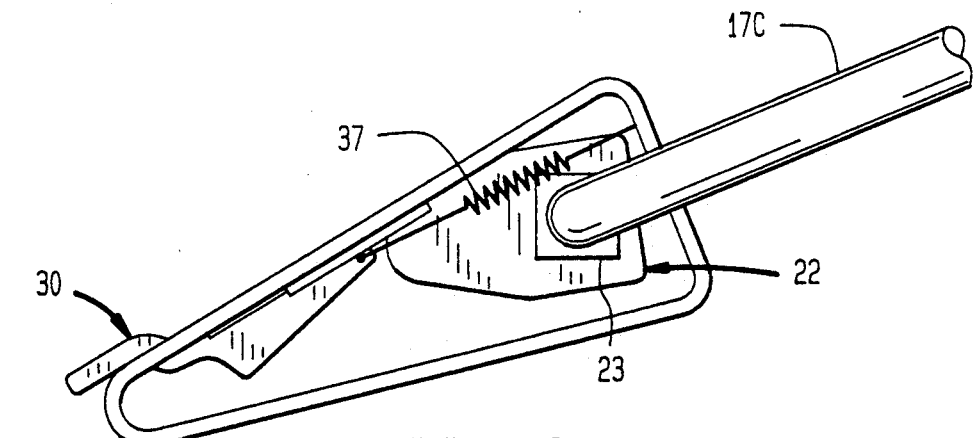
FIG. 6 illustrates a rear plan view of the handle apparatus of FIG. 3 illustrating the cam adjusting means in a retracted position and with the handle being rotated to flush a greater quantity of water down a toilet; and, FIG. 7 is a plan view of a cam adjusting means which provides for a multiple stage cam.

FIG. 6 illustrates the retracted position of cam adjusting member 30 relative to handle 20 and cam arrangement 22. With the cam adjusting member 30 in its retracted position, it is seen that cam surface 24 of cam arrangement 22 is in contact with the interior surface 27 of handle 20 and thereby provides for a full flush operation of all the water within tank 11. The operating position shown in FIG. 6 of the drawings corresponds with the "c" position of the arrangement shown in FIG. 1 of the drawings.

Thus, by simply positioning the cam adjusting apparatus 30 in either a forward or a rearward position, varies the amount of water to be flushed down a toilet. Moreover, this arrangement allows a person operating the toilet flushing arrangement to easily effectuate a change in the amount of water to be flushed down a toilet by simply retracting or engaging the cam adjusting apparatus 30. A spring member 37 may be attached between cam adjusting member 30 and the inside forward face of flushing handle 20 to bias the cam adjusting member 30 in the intermediate position as shown in FIG. 3.

In accordance with the drawings, it is seen that the inventive flush arrangement shown in FIGS. 3 through 7 of the drawings as compared to the prior art arrangement shown in FIG. 2 of the drawings allows for easy conversion of a prior art arrangement to the inventive arrangement.

Figure 4:
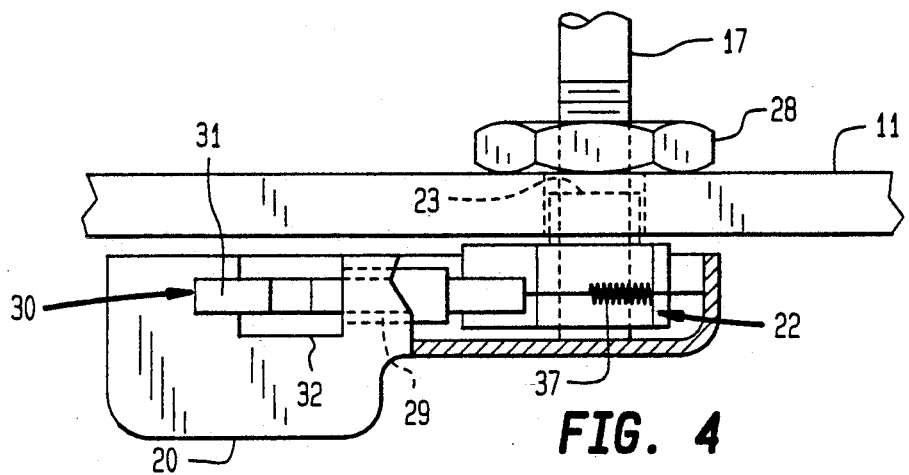
FIG. 4 is a top view of the handle arrangement of FIG. 3.

The top plan view of the arrangement shown in FIG. 4 of the drawings illustrates the manner in which the handle arrangement 20 and lever arm 17 attached thereto and the cam member 22 is attached to a wall of tank 11. A conventional nut 28 is threaded onto an extending portion of lever arm 17 such that cam 22 is fixed in position with regard to a wall of tank 11 and such that the square portion 23 thereof and, therefore, the cam 22 is fixedly positioned within an opening in the wall of toilet tank 11. This fastening arrangement also provides for the rotation of the handle 20 and lever arm 17 relative to cam 22 and the toilet tank 11 due to cam 22 being fixed in position by square portion 23. This rotation arrangement is consistent with a similar arrangement of the prior art.

Still referring to FIG. 4, the outside portion 31 of cam adjusting member 30 is seen to extend out from slot 32 provided within handle 20 while the inside portion 35 of cam adjusting member 30 is seen to extend over cam 22 and guided in its movement by tracks 29 which are attached to the inside of flush handle 20.

Figure 7:
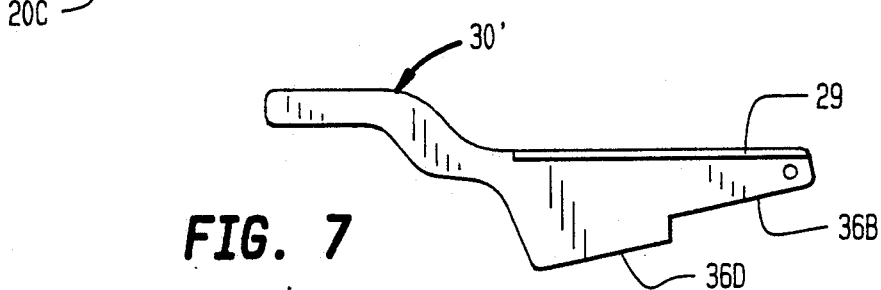

Although the drawings provided herein show only a full flush mode and an intermediate flush mode of operation of a toilet handle assembly, it is to be appreciated that a number of intermediate modes may also be attainable by the teachings provided herein. In order to accomplish intermediate modes of operation, it is simply required to provide the cam surface 36 of the cam adjusting member 30 with two or more parallel spaced cam surfaces 26b and 26d as shown in FIG. 7. With the cam surface 26d in contact with the cam surface 24 of cam member 22, a flush mode wherein a lesser amount of water is flushed down a toilet than that associated with cam surface 26b. Further, it is to be appreciated that the present inventive apparatus provides for any amount of water desired to be flushed down a toilet in accordance with the angle and thickness of cam surface 26 of the cam adjusting member 30.

In order to retro-fit a prior art toilet flushing arrangement with the inventive arrangement 10, it is only necessary to remove the prior art handle (which includes the cam mechanism) and replace the same with the flushing handle 20 equipped with a cam adjusting member 30 of the inventive arrangement 10 shown in FIGS. 3 and 4.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim as my invention:

1. Flushing handle apparatus for providing a tank equipped toilet with differing flushing modes of operation whereby a full flush mode and a partial flush mode through a valve member within the toilet tank is achievable comprising a single flushing handle having a cam member and a lever attached thereto, said lever being rotatable with respect to said cam member and said valve member is attached to said cam member for movement therewith within the toilet tank and cam adjusting means operationally connected to said flushing handle for varying the amount of rotation of said handle relative to said cam member whereby a lesser amount of rotation flushes a lesser amount of water down the toilet, said cam adjusting means comprising a wedge-shaped member capable of slidingly moving into and out of a space between said handle and said cam member so as to limit the relative movement of said lever with respect to said cam member thus limiting the lift of said valve member to perform a partial flush.

2. The apparatus of claim 1, wherein biasing means is used to bias said cam adjusting means within said space between said handle and said cam member.

3. The apparatus of claim 2, wherein said biasing member comprises a spring.

* * * * *